United States Patent

[11] 3,593,771

| [72] | Inventors | Ragnar L. Carlstedt;<br>Emlyn N. Smith, both of Ligonier, Pa. |
|---|---|---|
| [21] | Appl. No. | 764,541 |
| [22] | Filed | Oct. 2, 1968 |
| [45] | Patented | July 20, 1971 |
| [73] | Assignee | Kennametal, Inc.<br>Latrobe, Pa.<br>by said Carlstedt |

[54] TIRE STUD HAVING LIGHTWEIGHT WEAR-RESISTANT PIN
1 Claim, 4 Drawing Figs.

| [52] | U.S. Cl. | 152/210 |
|---|---|---|
| [51] | Int. Cl. | B60c 11/14 |
| [50] | Field of Search | 152/210 |

[56] References Cited
UNITED STATES PATENTS

| 2,572,996 | 10/1951 | Dunlap | 152/210 |
| 3,125,147 | 3/1964 | Hakka | 152/210 |
| 3,230,997 | 1/1966 | Carlstedt | 152/210 |
| 3,301,300 | 1/1967 | Natter | 152/210 |

OTHER REFERENCES

CEMENTED CARBIDES by Dr. Paul Schwarzkopf et al., 1960, pages 199— 202, Library Call No. T.P. 770 S3.

*Primary Examiner*—Arthur L. La Point
*Attorney*—Melvin A. Crosby

ABSTRACT: The invention concerns the tire stud consisting of a metal body with a head at one end and having a hard wear-resistant pin extending into the body from the other side. The invention is particularly characterized in that the pin is cemented titanium carbide while the body may be steel or a sintered metal powder. Of several powders that can be used stainless steel powder has certain advantages.

PATENTED JUL20 1971

3,593,771

INVENTORS
RAGNAR L. CARLSTEDT
EMLYN N. SMITH
BY Melvin A. Crosby

TIRE STUD HAVING LIGHTWEIGHT WEAR-RESISTANT PIN

The present invention is concerned with tire studs and, particularly, with tire studs having a novel type of lightweight wear-resistant pin therein.

Tire studs are well known and consist of somewhat rivet-shaped members which are placed in blind holes in a tire, head end foremost with the tip of the stud opposite the head projecting slightly beyond the surface of the tire tread.

The stud comprises a body portion, usually metal, with a hard wear-resistant pin inserted therein and projecting a short distance therefrom at the end of the stud body opposite the head end. Heretofore, the only successful tire stud pins were made of cemented tungsten carbide. The pins, which are on the order of about an eighth inch in diameter, are brazed or cemented or pressed into holes provided therefor in the stud body and form the principal road engaging portion of the tire stud. Cemented tungsten carbide has heretofore been the only suitable material having a wear rate compatible with that of tire tread material and which at the same time would withstand repeated impacts against a hard road surface such as concrete.

Cemented tungsten carbide pins, however, present certain drawbacks because tungsten carbide is expensive and is also heavy. Furthermore, tungsten is, at times, in relatively short supply and a large quantity of tungsten is required for making pins for the number of tire studs that are manufactured each year.

The present invention is concerned with the discovery of a stud pin for tire studs which is made of a material different from cemented tungsten carbide but which, at the same time, can be made to have a wear rate as good as that of cemented tungsten carbide and which offers advantages over cemented tungsten carbide.

In brief, the present invention proposes to make a wear-resistant pin for tire studs from a cemented titanium carbide base material rather than from a cemented tungsten carbide base material.

For a long time it has been thought that a titanium carbide base material would be unsuitable for use in tire stud pins because of the brittleness of materials formed with titanium carbide as the principal hard constituent. Test and experimentation however have developed a titanium carbide base material that has proved to be satisfactory for use in the pins of tire studs even though it has heretofore been considered that no cemented compound with titanium carbide as the principal wear-resistant ingredient could be used in this manner without chipping and crumbling away.

Among the advantages that are obtained by using a titanium carbide base material is that the pins made from this material are cheaper than those made from tungsten carbide base material. Titanium carbide furthermore weighs only about one-third as much as tungsten carbide and the titanium carbide base material weighs only slightly more than one-third as much as the tungsten carbide base material. Thus, studs containing cemented titanium carbide pins are substantially lighter than studs containing cemented tungsten carbide pins.

For the reason that the studs containing the cemented titanium carbide pins are lighter, the studs are substantially less noisy when running on a dry clear road. This feature is of importance because the studs do run on dry, clean roads most of the time.

Another advantageous characteristic of cemented titanium carbide pins is that its heat conductivity thereon is only about 50 percent of the heat conductivity of cemented tungsten carbide pins. The heat developed in a tire stud when it is in use is principally generated in the pin and, in particular, at the exposed end of the pin and by reducing the heat conductivity of the pin, the stud body will not reach as high a temperature as with the former cemented tungsten carbide pins.

In connection with the temperature increase of the stud body, a stud is exposed to the atmosphere for about nine-tenths of the time the tire is rotating and engages a road surface only about one-tenth of the time. Thus, the reduced heat conductivity of the cemented titanium carbide pin enables more of the heat generated in the stud pin to be dissipated to the atmosphere than is the case with the cemented tungsten carbide pin which relatively quickly transmits its heat to the stud body. The reduced temperature of the stud body is of importance because, at a certain temperature, somewhere around 300° F., tread rubber undergoes instant reversion and deteriorates so that studs which go above this temperature on the outer surface of the body will deteriorate the tread rubber and will become loose in the tread and will lose their effectiveness or will fall out of the tread. Furthermore, the life of the tire is reduced by the deterioration of the tread material in the vicinity of the stud.

Still further, the cost of titanium carbide per unit weight is about equal to that of tungsten carbide so that cemented titanium carbide pins of a given size are cheaper than cemented tungsten carbide pins of the same size.

The combination of the lower cost of titanium carbide and the lighter weight thereof introduces the advantageous possibility of making the pins larger in diameter while still arriving at lighter weight studs and less expensive studs.

A particularly advantageous combination can be arrived at by making the stud bodies of stainless steel, especially bodies made by sintering stainless steel powder because the heat conductivity of stainless steel is substantially less than that of a conventional low carbon steel, such as is usually employed for stud bodies. The described combination of stainless steel for the stud body and cemented titanium carbide for the pin substantially reduces the possibility that the tread material in the region of a stud reaching the critical reversion temperature of the tread material.

The possibility presents itself, in respect of cemented titanium carbide pins, of compounding the material so as to have a wear rate somewhat more rapid than that of material conventionally employed for tire stud pins. The use of a material for the pins which wears at a more rapid rate than conventional materials used for this purpose can be of merit in cases where the efficiency of the tire studs over a period of time is of paramount importance, or where, for some reason or the other, it is known that the tread material of the tire will wear at a fairly rapid rate. In the case of retreaded tires, for example, the wear rate of the tread material is generally somewhat higher than the rate at which the tread material of new tires occurs. Where the tread wear rate is high, if the studs wear extremely slowly the studs will commence to protrude an excessive distance beyond the surface of the tread material and will then tend to bend over as the tire rolls on a roadway and wear off at the sides. This will cause an excessive length of the pin to be exposed and the efficiency of the studs is not only reduced but, furthermore, the studs tend to loosen up in the tread material and will also cause excessive heat to be generated if the tire skids because of the large area of the stud which is in engagement with the road surface.

The nature of the present invention will be more clearly understood upon reference to the accompanying drawing, in which.

Figure 1:
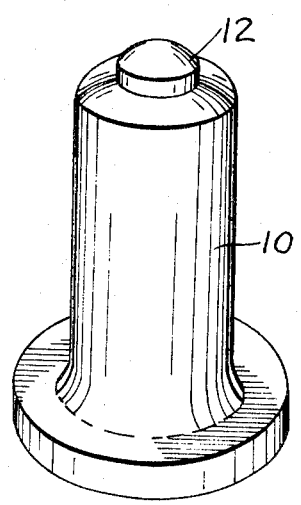
FIG. 1 is a perspective view showing a typical tire stud according to the present invention.

In the drawing, in FIG. 1, the stud comprises a body 10 having a pin 12 therein of cemented titanium carbide.

A suitable composition of the pin material would be, by weight about 76 percent titanium carbide, 10 percent cobalt or nickel, 10 percent tungsten carbide and 4 percent cromium. This material has proved to be impact-resistant so that it does not chip and crumble under repeated impacts against a dry, hard road surface; has wear-resistance compatible with that of good tread rubber; and is substantially lighter and cheaper than a corresponding mixture replacing the titanium carbide with tungsten carbide.

Figure 3:
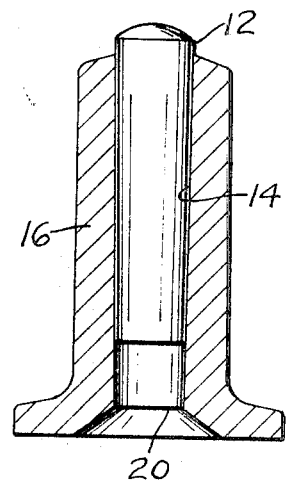
FIG. 3 is a view like FIG. 2 but showing another type of body.
Figure 2:
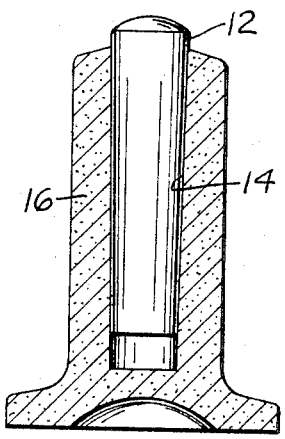
FIG. 2 is a vertical transverse sectional view through the stud showing one type of body.

FIGS. 2 and 3 will show that pin 12 is tapered from top to bottom and that it is pressed into a bore 14 in the stud body which may, itself, have a tapered entrance end to facilitate insertion of the pin into the bore. The bore 14 may terminate within the shank 16 of the stud body as indicated by reference numeral 20 in FIG. 3.

The material of the stud body may be a low carbon steel, or it may be a sintered powder material. In either case, stainless steel is an advantageous material to employ because of its substantially lower heat conductivity than low carbon steel.

Figure 4:
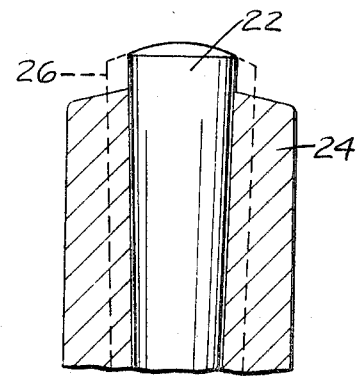
FIG. 4 is a fragmentary view showing at enlarged scale a part of a stud illustrating a practical ratio between the size of a cemented tungsten carbide pin and a cemented titanium carbide pin which would be lighter and more inexpensive.

FIG. 4 shows a pin 22 formed of cemented tungsten carbide material in a stud shank 24. The dotted lines show the size to which a pin 26 could be made of cemented titanium carbide while still being substantially lighter than pin 22. In a typical small tire stud, for example, pin 22 might have a maximum diameter of 0.107 inches at the large end and weigh about 0.53 grams while pin 26 could be made to a maximum diameter of 0.135 inches at the larger end and would weigh only about 0.36 grams. The larger pin gives improved traction and also reduces the amount of material required for the stud body whereby the stud body can be made more easily and somewhat more cheaply than heretofore. The reduction in the amount of material in the stud body results in even more reduction in the weight of the stud, especially where the stud body is made of solid steel.

In addition to the composition given above which was identified as being satisfactorily wear-resistant, is also been found that a composition consisting, by weight, of 80 percent titanium carbide, 18 percent iron and 2 percent silicon also has good wearing characteristics.

As has been mentioned, there are instances wherein a somewhat faster wear rate of the carbide pins is to be preferred, either due to the employment of the studs with tires in which the tread material wears off relatively rapidly, or when the studs are mounted in tires which are, in turn, mounted on vehicles which encounter or are subjected to driving conditions which cause relatively rapid wear off the tread material.

Amongst the compositions of the nature disclosed herein which wear at a somewhat more rapid rate than the ones identified above can be included the following compositions, with the percentages again given by weights:

|     | #1 | #2  | #3  | #4 |
| --- | -- | --- | --- | -- |
| TiC | 76 | 79.5 | 79.5 | 75 |
| Ni  | 10 | 5   |     | 15 |
| Cr  | 4  |     |     |    |
| Wc  | 10 | 10  |     | 10 |
| Mo  |    | 0.5 | 0.5 |    |
| Co  |    | 5   | 10  |    |
| W   |    |     | 10  |    |

The foregoing examples of pins having titanium carbide as a major constituent are not exhaustive of such compositions but give representative examples of compositions which have, in tests, exhibited the characteristics referred to.

It will be understood that the present invention is susceptible of modification and adaptation within the scope of the appended claims.

We claim:

1. In a tire stud; a metal body comprising a cylindrical shank and a disclike head at one end of the shank, said shank having an axial bore extending therein from the end opposite the head end thereof, and a hard wear-resistant pin fixed in said bore and projecting therefrom a distance which is less than the diameter of said bore, said pin consisting by weight of about 76 percent titanium carbide, about 10 percent of a metal selected from the class of cobalt and nickel, about 10 percent tungsten carbide, and about 4 percent chromium.